Oct. 7, 1924.
E. P. DUMANOIS
CARBURETING APPARATUS
Filed April 24, 1923
1,510,836
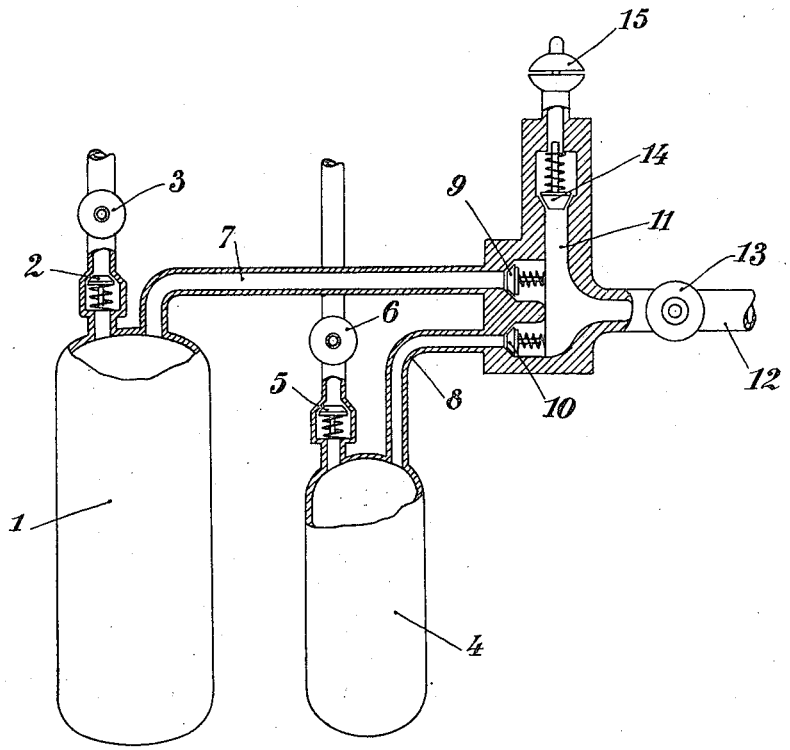
Emile Paul Dumanois
INVENTOR;
By [signature]
his Attorney.

Patented Oct. 7, 1924.

1,510,836

UNITED STATES PATENT OFFICE.

EMILE PAUL DUMANOIS, OF PARIS, FRANCE.

CARBURETING APPARATUS.

Application filed April 24, 1923. Serial No. 634,210.

*To all whom it may concern:*

Be it known that I, EMILE PAUL DUMANOIS, citizen of the French Republic, residing at Paris, in the French Republic, have invented new and useful Improvements in Carbureting Apparatus, of which the following is a specification.

The present invention has for its object a carbureting apparatus permitting to obtain a mixture of air and combustible gas having a well-defined composition and pressure. Said apparatus is a modification of the devices described in my prior patent application 547,623 and is particularly advantageous when one of the gaseous constituents of the mixture is stored under pressure, whilst the other may also be stored under pressure or brought by means of a pump to the desired pressure, in order to finally obtain the necessary quantity of carburetted mixture at a sufficient pressure.

An important feature of the carbureting apparatus according to the invention is that it comprises two reservoirs into which the air and the fuel gas are delivered, these two fluids being either stored up at the same pressure by means of a system of automatic valves, or stored up at different pressures, the mixture of these two fluids being made at the time of use by the discharge into a common piping; the proportioning is effected in accordance with the respective volumes of the reservoirs and the pressures prevailing therein in case these pressures are different.

The carbureting apparatus according to the invention may be particularly used to form a gas mixture whose combustion gives a flame whose chemical properties are well determined, either oxidizing or carbureting, or further in order to form a mixture having a rapid combustion for the starting of internal combustion engines in all their applications.

The accompanying drawing shows diagrammatically by way of example an embodiment of the invention.

The air reservoir 1 is supplied by a source of compressed air, storage device or pump, through the intermediary of a clack valve 2 and a cock 3. The fuel gas reservoir 4 is also supplied either by a storage device containing the compressed or dissolved gas, by a generator or by a pump, through the medium of the clack valve 5 and the cock 6.

The reservoirs 1 and 4 communicate respectively through the pipes 7 and 8 and the automatic valves 9 and 10 with a mixing chamber 11 of suitable capacity having thereon the outlet pipe 12 for the carburetted mixture. A cock or valve 13 with rapid closing, of the quick stroke or punch type for example, is mounted on the pipe 12. The inner surface of the mixing device has a suitable profile in order to obviate eddies and to offer no hindrance to the discharge of the mixture into the piping 12. On the mixing device is mounted a valve 14 whose spring has a suitable tension corresponding to the common pressure which is to be had in each reservoir 1 and 4; said valve 14 actuates an indicating apparatus 15 of any kind, but which may be constituted for example simply by a whistle.

The operation of the carbureting apparatus is as follows: The cock 3 is opened, and the compressed air coming from a storage device or a pump enters the reservoir 1, opens the valve 9, enters the mixing device 11 and closes the valve 10; the valve 14 is closed by its spring. When the pressure in the reservoir 1 and chamber 11 is sufficient, the valve 14 is raised from its seat, and this sets the indicator 15 in operation. The cock 3 is then closed and the valve 14 closes. If the feed is carried out by a pump, the cock 3 can be dispensed with.

The cock 6 is now opened, and the compressed gas coming for example from a storage device now enters the reservoir 4. The valve 10 is always held on its seat since the pressure in the reservoir 1 is still prevailing in the chamber 11. When the pressure within the reservoir 4 becomes equal to that in the reservoir 1, the valve 10 opens, and an instant after, the pressure in the mixing chamber 11 becomes higher than that corresponding to the tension of the spring of the valve 14, so that the latter will open and the indicator 15 is set in operation while the valve 9 is closed. The cock 6 is then closed. In this manner, the reservoir 1 is filled with air and the reservoir 4 is filled with combustible gas, the pressure in both reservoirs being the same and being that which corresponds to the adjustment of the spring of the valve 14.

It is thus simply necessary that the two reservoirs shall have the relative volumes determined by the composition of the requisite carburetted mixture, with suitable sections of the pipes 7 and 8, in order to obtain, by opening 13, the simultaneous discharge of the two fluids through the valves 9 and 10, and to obtain the desired mixture, provided the valves 9 and 10 are adjusted for the same pressure, the latter being preferably as low as possible.

Obviously, instead of using a single valve 14 with an indicator 15, use may be made of one valve upon each reservoir or said valve may be replaced by a pressure gauge. When two valves having been suitably relatively adjusted are used, it is possible to utilize the two fluids at different pressures by a suitable modification of the volume of the reservoirs. In the last two cases, the valves 9 and 10 are replaced by closing devices with simultaneous control for example of the punch type, and the closing device 13 is suppressed. When the reservoirs are filled and at the desired pressure, it is simply necessary to operate the control device providing for the simultaneous opening of both closing devices, in order to form the carburetted mixture in the common discharge pipe.

Having now described my invention, I declare that what I claim as new and desire to secure by Letters Patent is:

In a carbureting apparatus the combination with two reservoirs into which air and combustible gas are respectively filled under pressure, a mixing chamber, two pipes each connecting one of said reservoirs to said mixing chamber, of two nonreturn valves provided at the entrance of said pipes into the said mixing chamber whereby the fluids may flow into the mixing chamber but not return to the reservoirs, a loaded valve on said mixing chamber whereby the successive filling of the said reservoirs may be made at the same pressure, a discharge pipe fitted to said mixing chamber and means for closing said discharge pipe.

In testimony whereof I have signed my name to this specification.

EMILE PAUL DUMANOIS.